United States Patent
Xu (10) Patent No.: US 10,006,525 B2
(45) Date of Patent: Jun. 26, 2018

(54) FLEXIBLY ENGAGED CONTINUOUSLY VARIABLE TRANSMISSION GEARBOX

(71) Applicant: Yu Xu, Suzhou (CN)

(72) Inventor: Yu Xu, Suzhou (CN)

(73) Assignee: Yu Xu, Suzhou (CN)

( * ) Notice: Subject to any disclaimer, the term of this patent is extended or adjusted under 35 U.S.C. 154(b) by 355 days.

(21) Appl. No.: 14/898,558

(22) PCT Filed: May 23, 2014

(86) PCT No.: PCT/CN2014/078330
§ 371 (c)(1),
(2) Date: Dec. 15, 2015

(87) PCT Pub. No.: WO2014/201938
PCT Pub. Date: Dec. 24, 2014

(65) Prior Publication Data
US 2016/0153531 A1    Jun. 2, 2016

(30) Foreign Application Priority Data

Jun. 17, 2013   (CN) .......................... 2013 1 0238180

(51) Int. Cl.
*F16H 9/10*     (2006.01)
*F16H 9/00*     (2006.01)
(Continued)

(52) U.S. Cl.
CPC .................................... *F16H 9/24* (2013.01)

(58) Field of Classification Search
CPC ... F16H 9/08; F16H 9/10; F16H 55/54; F16H 9/24; F16H 9/14
(Continued)

(56) References Cited

U.S. PATENT DOCUMENTS 178,029 A * 5/1876 Shaklee .................. F16H 55/54
474/54
692,219 A * 1/1902 Temple .................... F16H 9/10
474/53
(Continued)

FOREIGN PATENT DOCUMENTS

CN           1292467 A      4/2001
CN           1448646 A     10/2003
(Continued)

*Primary Examiner* — Henry Y Liu
(74) *Attorney, Agent, or Firm* — SZDC Law P.C.

(57) ABSTRACT

A flexibly engaged continuously variable transmission gearbox includes the following components connected sequentially in a transmission: a power input shaft conical roller, a sectional input flexible sprocket, a tooth-shaped chain, a sectional output flexible sprocket, a power output shaft conical roller. When the power input shaft conical roller rotates, it drives five sectional input flexible sprocket members that are slidably matched in five equidistant T-shaped grooves on the conical roller to rotate. The sectional input flexible sprocket drives the tooth-shaped chain engaged therewith to transmit, and thus drives the five sectional output flexible sprocket members that are slidably matched in the five equidistant T-shaped grooves on the output shaft conical roller to rotate. The five sectional output flexible sprocket members are connected to the output shaft conical roller through the five equidistant slidable T-shaped grooves.

9 Claims, 13 Drawing Sheets

(51) Int. Cl.
*F16H 59/00* (2006.01)
*F16H 61/00* (2006.01)
*F16H 63/00* (2006.01)
*F16H 9/24* (2006.01)

(58) Field of Classification Search
USPC .................................. 474/53, 54, 83
See application file for complete search history.

(56) References Cited

U.S. PATENT DOCUMENTS

| | | | | | |
|---|---|---|---|---|---|
| 693,545 | A | * | 2/1902 | Jacobsen | F16H 55/54 474/53 |
| 944,585 | A | * | 12/1909 | Watson | F16H 9/08 474/150 |
| 1,091,338 | A | * | 3/1914 | Houpt | F16H 9/08 474/1 |
| 1,160,414 | A | * | 11/1915 | Kelsey | F16H 9/10 474/53 |
| 1,379,504 | A | * | 5/1921 | Young | F16H 9/10 474/53 |
| 1,446,294 | A | * | 2/1923 | Healey | F16H 9/10 474/53 |
| 1,969,792 | A | * | 8/1934 | Gates | F16G 1/08 474/167 |
| 2,344,341 | A | * | 3/1944 | Coen | F16H 9/08 474/53 |
| 2,552,179 | A | * | 5/1951 | Kamp | F16H 9/10 474/53 |
| 2,705,892 | A | * | 4/1955 | Yeager | F16H 9/08 474/70 |
| 2,898,772 | A | * | 8/1959 | Campbell | F16H 9/08 474/146 |
| 2,941,409 | A | * | 6/1960 | Witt | F16H 9/08 474/72 |
| 3,021,717 | A | * | 2/1962 | Bondurant | F16H 9/08 474/153 |
| 3,209,607 | A | * | 10/1965 | Busker | D21F 7/02 474/70 |
| 3,873,128 | A | * | 3/1975 | Dunder | B62M 11/12 280/236 |
| 3,906,809 | A | * | 9/1975 | Erickson | F16H 9/08 474/83 |
| 4,842,569 | A | * | 6/1989 | Orr | B62M 1/36 474/140 |
| 4,875,389 | A | * | 10/1989 | Fragnito | F16H 9/08 474/53 |
| 5,226,854 | A | * | 7/1993 | Hauser | F16H 55/54 474/83 |
| 5,984,814 | A | * | 11/1999 | Davenport | B62M 9/08 474/50 |
| 6,152,844 | A | * | 11/2000 | Daugherty | F16H 9/10 474/49 |
| 6,575,856 | B2 | * | 6/2003 | Anderson | F16H 9/08 474/83 |
| 6,626,780 | B2 | * | 9/2003 | Fragnito | F16H 9/24 474/47 |
| 6,656,070 | B2 | * | 12/2003 | Tay | F16H 9/10 474/53 |
| 6,908,406 | B2 | * | 6/2005 | Overbay | F16H 15/22 474/54 |
| 7,563,185 | B2 | * | 7/2009 | Naude | F16H 9/14 474/47 |
| 7,722,490 | B2 | * | 5/2010 | Tay | F16H 55/56 474/83 |
| 8,393,984 | B2 | * | 3/2013 | Naude | F16H 9/14 474/49 |
| 8,628,439 | B2 | * | 1/2014 | Tay | F16H 9/08 474/83 |
| 9,651,123 | B2 | * | 5/2017 | Tay | F16H 9/08 |
| 2002/0151396 | A1 | * | 10/2002 | Fragnito | F16H 9/24 474/83 |
| 2005/0221926 | A1 | * | 10/2005 | Naude | F16H 9/14 474/8 |

FOREIGN PATENT DOCUMENTS

| | | |
|---|---|---|
| CN | 1936365 A | 3/2007 |
| CN | 101220853 A | 7/2008 |
| CN | 102345713 A | 2/2012 |
| CN | 103307237 A | 10/2015 |
| DE | 4107738 A1 | 9/1991 |
| JP | 4277556 B2 | 6/2009 |

* cited by examiner

FLEXIBLY ENGAGED CONTINUOUSLY VARIABLE TRANSMISSION GEARBOX

This application is a national stage application of PCT/CN2014/078330, filed on May 23, 2014, which claims priority to Chinese Patent Application No. 201310238180.2, filed on Jun. 17, 2013, each of which is incorporated by reference for all purposes as if fully set forth herein.

FIELD OF THE INVENTION

The present invention relates to a speed variator during power transmission, which is especially suitable for the speed variation section for an automobile or motorcycle engine outputs power.

BACKGROUND OF THE INVENTION

Currently, all the automatic transmission gearboxes on the internal combustion engine of automobiles, motorcycles and so on, can be divided into two categories according to the speed variation type, self-shifting gear transmission and continuously variable transmission. A self-shifting gear transmission is characterized by large output torque, but suffers from structural complexity, high maintenance costs, large fuel consumption, gear impact in the travel process, poor comfort and other shortcomings. The current automatic continuously variable transmission, i.e. CVT, is mainly based on a steel strip (or steel chain) friction conical pulley CVT, which changes the power rate output through one steel strip (or steel chain) and two diameter-variable friction conical pulleys. It has the advantages of smooth power output, no shift impact, and low fuel consumption. However, because it is based on the principle of transferring power output by the friction between the steel strip (or steel chain) and the conical pulley, the ratio relation between the power transmission efficiency and the pressing force needs to be fully balanced to control the friction between the steel strip and the conical pulley; when the pressing force is large, the friction is large, and then the transferred torque is also large, but the transmission efficiency is reduced, and thus the output torque is basically less than 300 N/M. Especially in the large torque output area above 200 N/M, the torque loss is huge, and therefore a car is easy to run idle and coast when it is started or goes up hill. This is also the main reason why CVT has failed to be widely promoted. Therefore, CVT is generally used on mini cars and small cars.

SUMMARY OF THE INVENTION

The object of the present invention is to provide a new flexible sectional toothed sprocket continuously variable transmission gearbox, so as to overcome the shortcoming of the existing CVT that it cannot output large torque. The new transmission not only has such characteristics of an ordinary conventional gearbox as large transmission torque and low energy loss, but also has the advantages of smooth torque output, no shifting impact and simple structure. It has the maximum output gear ratio of 6.25 times, and the maximum transmission torque of 1000 N/M or more, wherein the torque can be further increased, the energy loss is almost unchanged, while the volume is slightly increased.

The speed variation principle of this technical solution is as follows: The variable transmission is achieved by engagement of a tooth-shaped chain with a sectional flexible sprocket; with five equidistant T-shaped grooves on the input and output conical rollers, a flexible sprocket with an equal pitch of teeth is composed of five sectional input and output flexible T-shaped sprocket members respectively slidably matched in parallel in the T-shaped groove; the pitch of teeth of the sectional flexible sprocket will not be changed by changing the different engagement diameter position of the tooth-shaped chain and the sectional flexible sprocket in the five equidistant T-shaped grooves on the input and output shaft conical rollers, such that the transmission fitted with the fixed-pitch tooth-shaped chain can be remained unchanged. With the input rotational speed kept constant, the engagement linear velocity of the sectional flexible sprocket and the tooth-shaped chain will change correspondingly with the engagement diameter of the input and output shaft conical rollers, the larger the diameter the greater the linear velocity, the smaller the diameter the less the linear velocity, such that the rotational speed of the output spindle is changed to achieve the output rotational speed required to be set.

The present invention uses the following technical solution to solve its technical problem: By the rotation of the input shaft conical roller, the input power drives the five sectional input flexible sprocket members that are slidably matched in the five equidistant T-shaped grooves on the input shaft conical roller to rotate, so as to make use of the sectional flexible sprocket to drive the tooth-shaped chain engaged therewith to transmit; then the tooth-shaped chain drives the five sectional output flexible sprocket members that are slidably matched in the five equidistant T-shaped grooves on the output shaft conical roller to rotate, with the five sectional output flexible sprocket members connected to the output shaft conical roller through the five equidistant slidable T-shaped grooves, thus driving the output shaft conical roller to rotate to output power. The rotational speed is adjusted mainly with a lead screw by adjusting the location and distance of a nut idler wheel cooperating therewith between the different diameters of the conical roller; with the rotational speed of the input shaft fixed, when the sectional input flexible sprocket is in a certain engagement diameter position in the five equidistant T-shaped grooves on the input shaft conical roller, a greater linear velocity will be obtained in a position on the input shaft conical roller having a bigger diameter, and conversely a less linear velocity will be obtained in a position on the input shaft conical roller having a smaller diameter, such that a corresponding set rotational speed can be obtained simply by adjusting the different engagement diameter position of the sectional flexible sprocket sliding on the conical roller. The two conical rollers of the input and output shafts have the equal diameter and taper, and are arranged in the transmission gearbox forwardly and reversely; therefore, the engagement center distance can be remained unchanged, thus ensuring unchanged circumference of the tooth-shaped chain during the speed adjustment.

Adjustment of the different engagement diameter position of the sectional flexible sprocket on the conical roller: With the input shaft mounted and rotated on the transmission gearbox housing, the servo-motor drives a sun gear to rotate, and then drives planet gears cooperating therewith to rotate; with the planet gears connected to rotational speed adjustment lead screws through a fixed key, the rotational speed adjustment lead screws are distributed around the conical roller respectively in the form of an umbrella, and drive a rotational speed adjustment nut idler wheel to move linearly along the axial direction of the lead screw; the rotational speed adjustment nut idler wheel, having a recess half surrounding the teeth of the tooth-shaped chain and the flexible sprocket, drives the tooth-shaped chain and the flexible sprocket to move linearly together, thus changes the different engagement diameter position of the sectional flexible sprocket sliding in the five equidistant T-shaped grooves on the input and output shaft conical rollers, and finally makes the engagement linear velocity of the sectional flexible sprocket and the tooth-shaped chain become greater or less, the larger the diameter the greater the linear velocity, the smaller the diameter the less the linear velocity, so that the rotational speed of the output spindle is changed to achieve the output rotational speed required to be set.

With the above technical solution, the present invention has the following beneficial effects: While retaining such features of an ordinary conventional gear engagement transmission as transmitting large torque, the present invention also has the advantages such as smooth torque output, no shifting impact, fuel economy, and simple structure.

Figure 4:
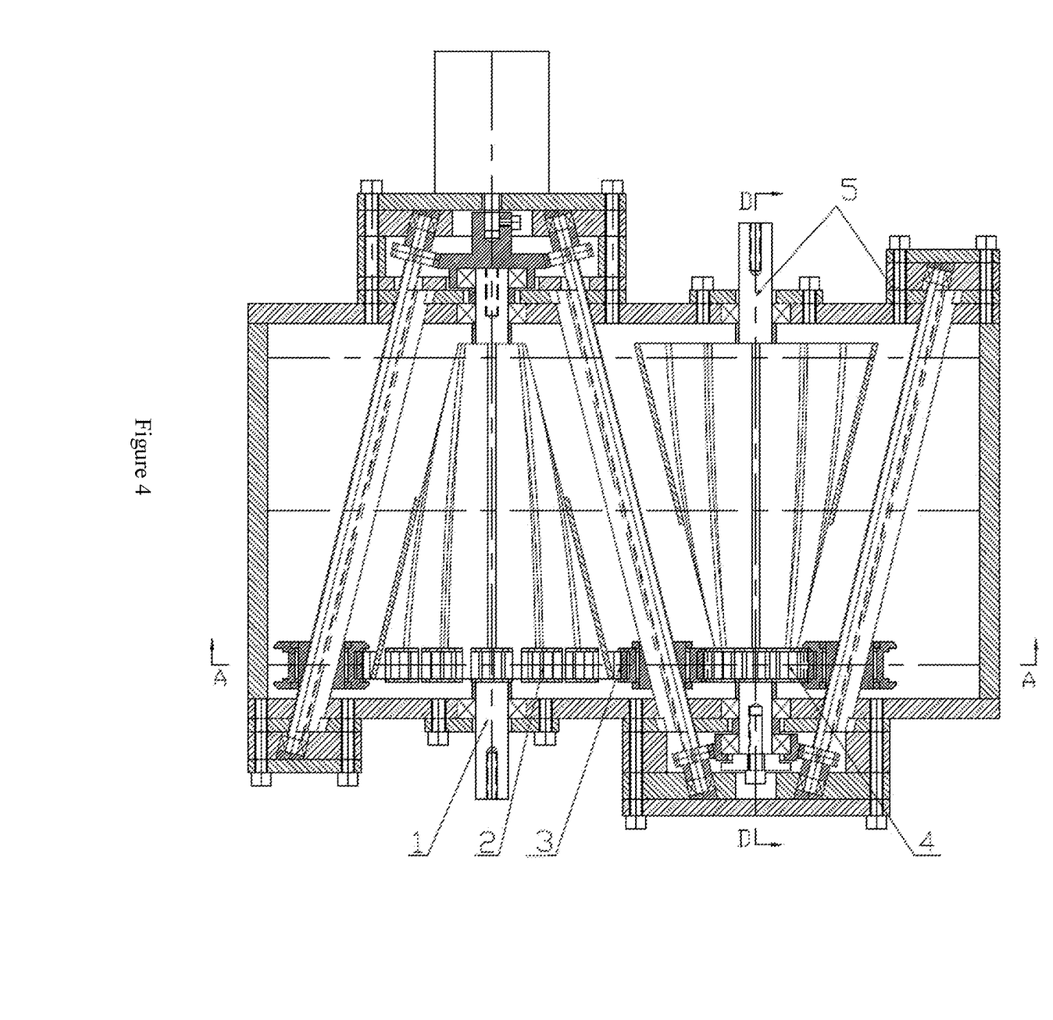
FIG. 4 is a top view of the present invention in the H-H direction while it is running at a high speed, and is also a top view of an axial speed adjustment actuator of the present invention while it is running at a high speed.

In FIG. 4: (1) A power input shaft conical roller; (2) a sectional flexible input sprocket composed of T-shaped sprocket members; (3) a tooth-shaped chain; (4) a sectional flexible output sprocket composed of T-shaped sprocket members; and (5) a power output shaft conical roller.

Figure 5:
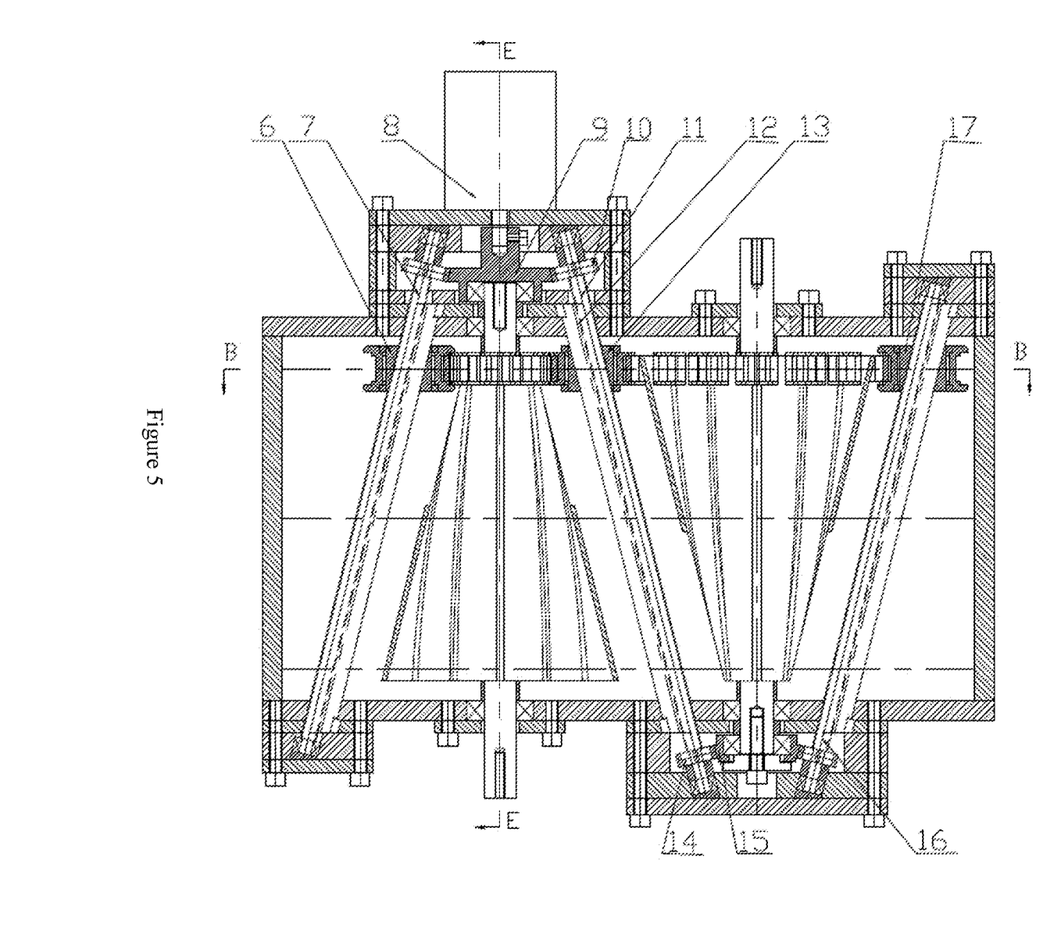
FIG. 5 is a top view of the present invention in the L-L direction while it is running at a low speed, and is also a top view of the axial speed adjustment actuator of the present invention while it is running at a low speed.

In FIG. 5: (6) An input-shaft toothed-chain rotational speed adjustment roller; (7) an input shaft rotational speed adjustment lead screw; (8) a speed adjustment servo motor; (9) an input shaft speed adjustment sun gear; (10) an input shaft speed adjustment planet gear; (11) a rotational speed adjustment lead screw shared by the input and output shafts; (12) a rotational speed adjustment screw guide pillar; (13) a rotational speed adjustment nut idler wheel shared by the toothed-chain input and output shafts; (14) an input shaft speed adjustment planet gear; (15) an output shaft speed adjustment sun gear; (16) an input shaft rotational speed adjustment lead screw; and (17) a toothed-chain rotational speed output adjustment nut idler wheel.

Figure 7:
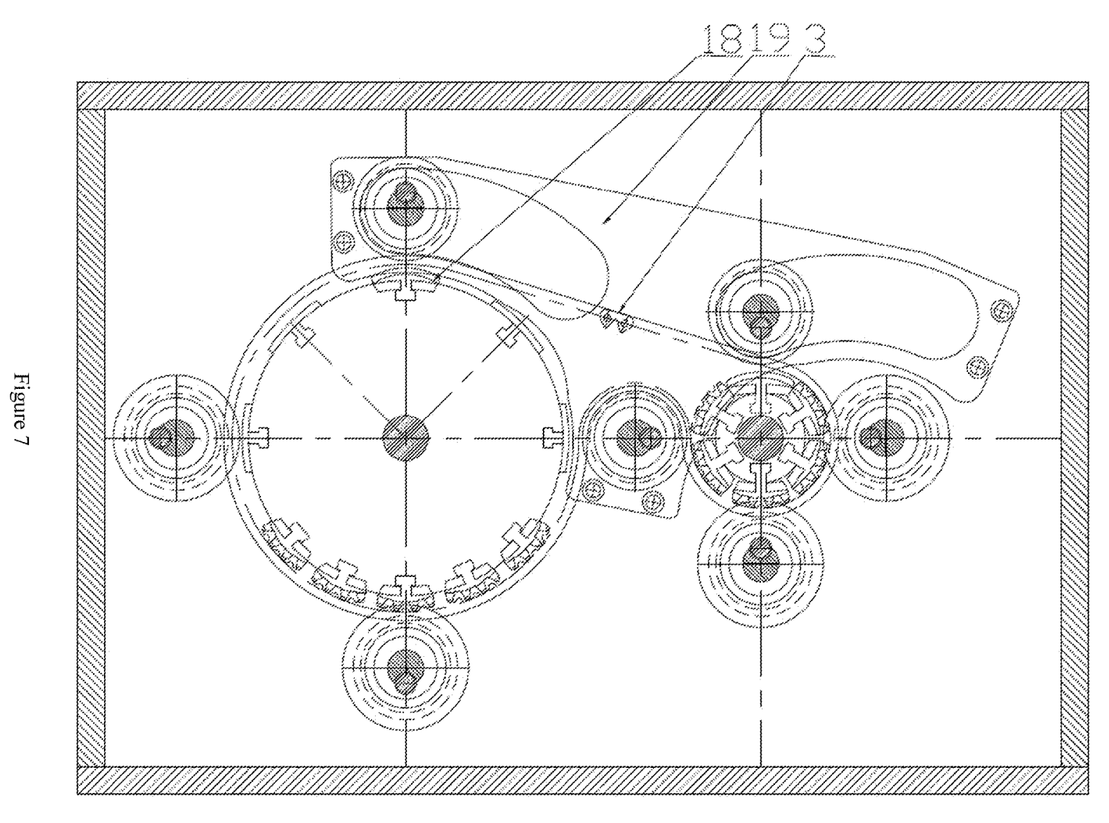
FIG. 7 is a sectional view of the present invention in the A-A direction while it is running at a high speed.

In FIG. 7: (18) An anti-skid tensioning block of the T-shaped tooth-shaped chain; and (19) an anti-skid positioning mechanism of the T-shaped flexible sprocket member.

Figure 11:
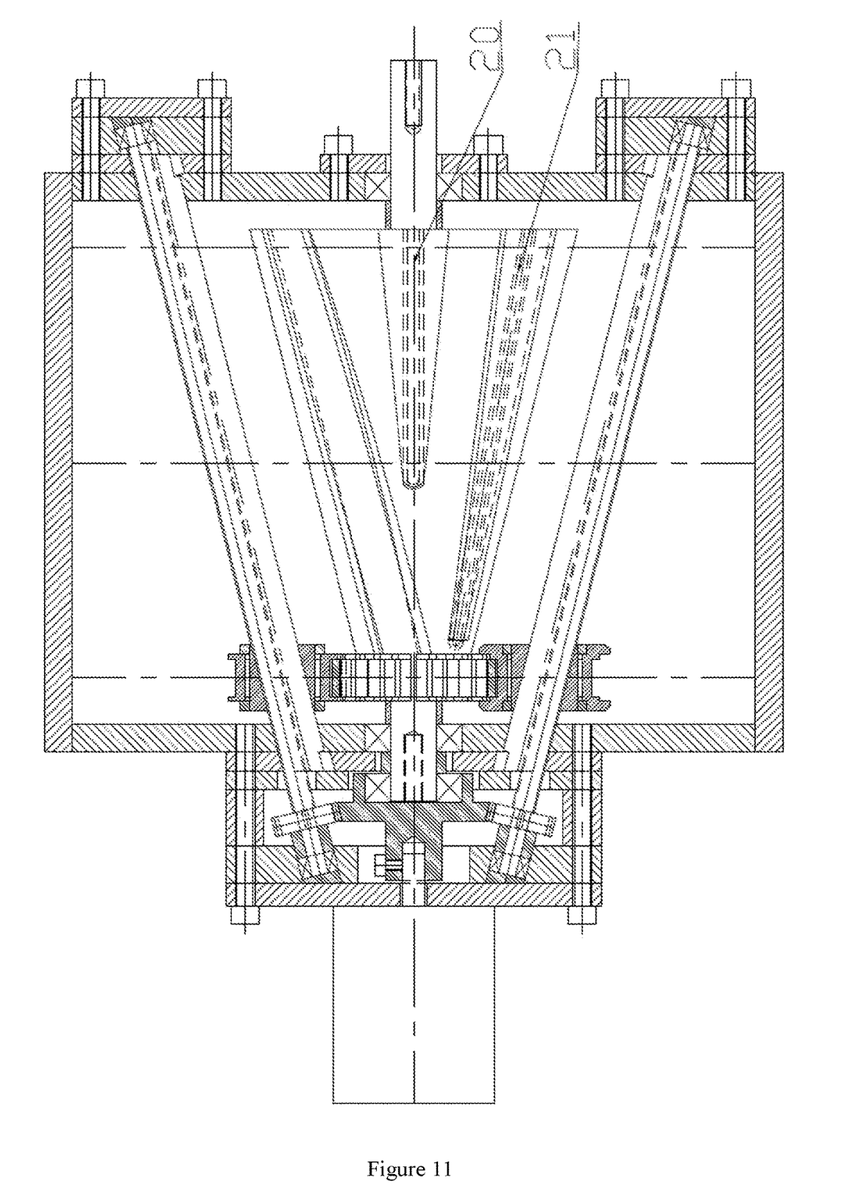
FIG. 11 is a left sectional view of the present invention in the E-E direction.
Figure 12:
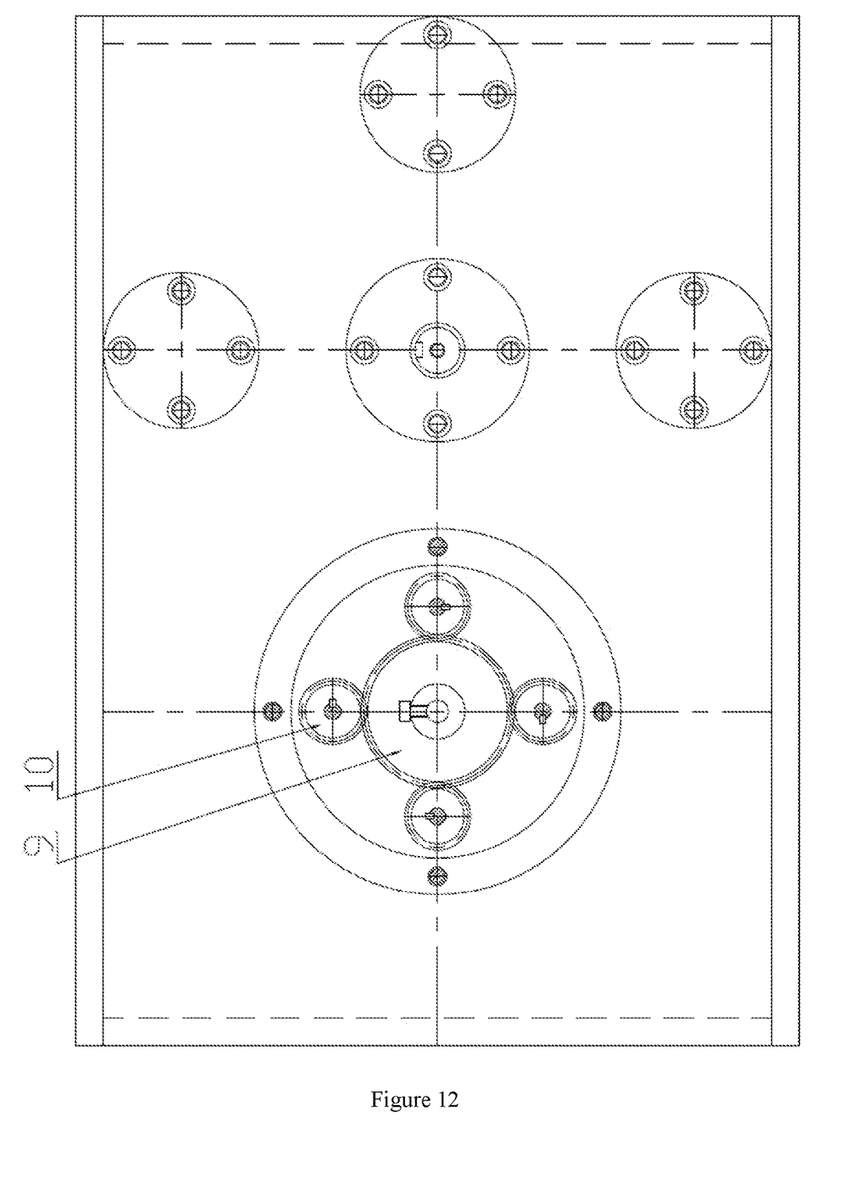
FIG. 12 is a sectional view of a driving planet gear speed adjustment actuator of the present invention in the F-F direction.
Figure 13:
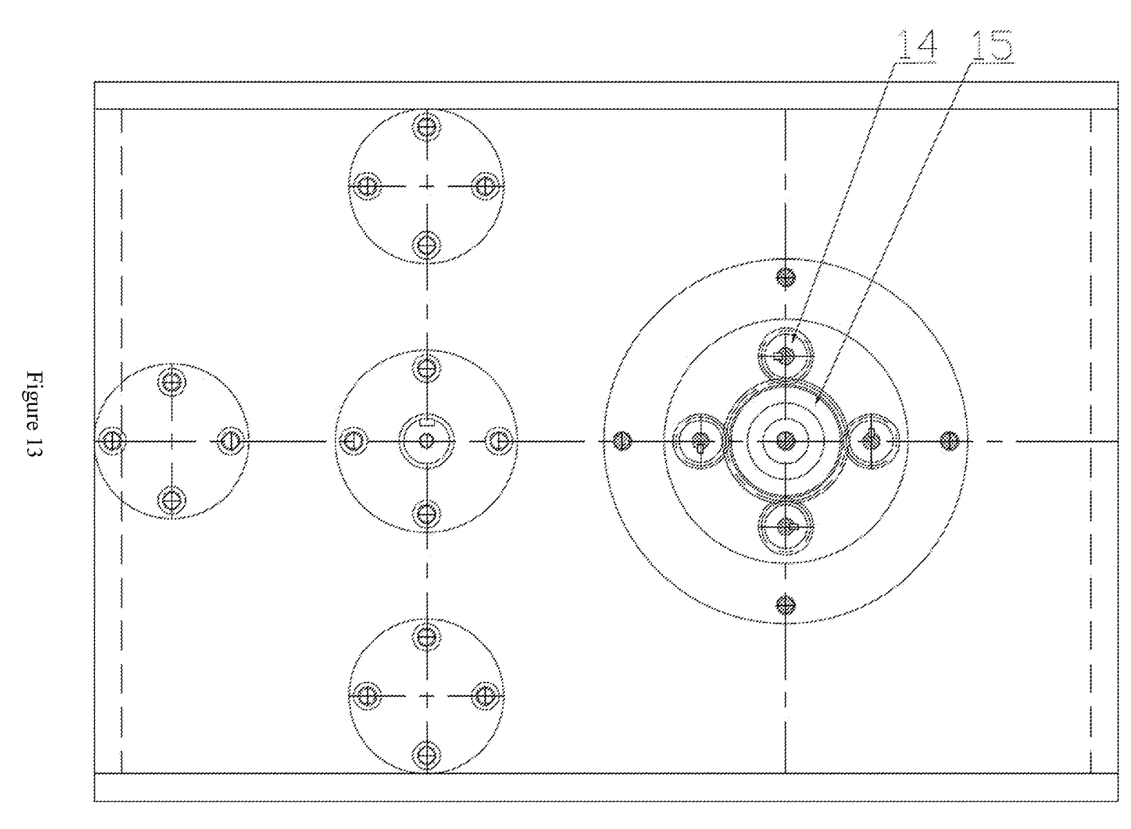
FIG. 13 is a sectional view of a driven planet gear speed adjustment actuator of the present invention in the G-G direction.

In FIG. 11: (20) A conical toothed-chain symmetrical tensioning balance block; and (21) a conical toothed-chain tensioning balance block.

DETAILED DESCRIPTION OF THE EMBODIMENTS

The present invention will be further described below with reference to drawings and examples.

Example: A flexibly engaged continuously variable transmission gearbox is provided, as shown in the figures.

I. The power input/output sequential transfer process of the transmission:

In FIG. 4: A power input shaft conical roller 1→a sectional flexible input sprocket 2 composed of T-shaped sprocket members→a tooth-shaped chain 3→a sectional flexible output sprocket 4 composed of T-shaped sprocket members→a power output shaft conical roller 5.

In the power transmission process, by the rotation of the input shaft conical roller 1, power drives the five sectional input flexible sprocket members 2 to rotate that are slidably matched in the five equidistant T-shaped grooves on the input shaft conical roller; then the sectional flexible sprocket drives the tooth-shaped chain 3 engaged therewith to transmit, and then drives the five sectional output flexible sprocket members 4 to rotate that are slidably matched in the five equidistant T-shaped grooves on the output shaft conical roller, with the five sectional output flexible sprocket members connected to the five equidistant slidable T-shaped grooves on the output shaft conical roller 5, thus driving the output shaft conical roller 5 to rotate to output power.

II. The sequential transfer process of the rotational speed adjustment actuator components of the transmission:

In FIG. 5:

The speed adjustment process at the end of the input shaft is as follows: A rotational speed adjustment servo motor 8→an input shaft rotational speed adjustment sun gear 9→four input shaft rotational speed adjustment planet gears 10→three input shaft rotational speed adjustment lead screws 7 and one rotational speed adjustment lead screw 11 shared by the input and output shafts→three toothed-chain rotational speed input adjusting nut idler wheel 6 on four rotational speed adjustment screw guide pillars 12, and one rotational speed adjustment nut idler wheel 13 shared by the toothed-chain input and output shafts a tooth-shaped chain 3.

The speed adjustment process at the end of the output shaft is as follows: A rotational speed adjustment lead screw 11 shared by the input and output shafts→an output shaft rotational speed adjustment planet gear 14 on the shared rotational speed adjustment lead screw→an output shaft rotational speed adjustment sun gear 15→the rest three output shaft rotational speed adjustment planet gears 14→three output shaft rotational speed adjustment lead screws 16→three toothed-chain rotational speed output adjusting nut idler wheel 17 on four rotational speed adjustment screw guide pillars 12, and one rotational speed adjustment nut idler wheel 13 shared by the toothed-chain input and output shafts→a tooth-shaped chain 3.

Figure 1:
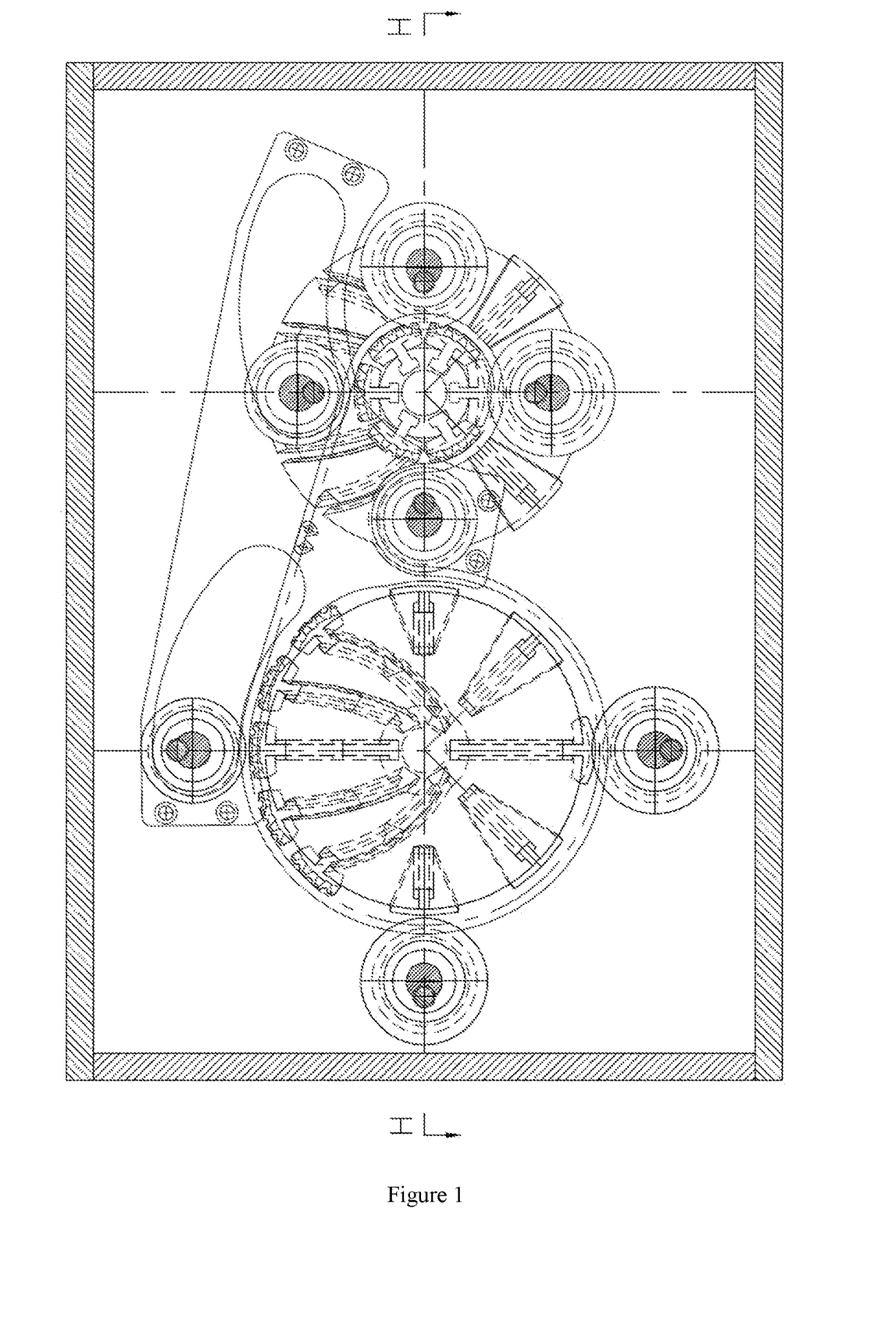
FIG. 1 is a front view of the present invention in the A-A direction while it is running at a high speed.
Figure 2:
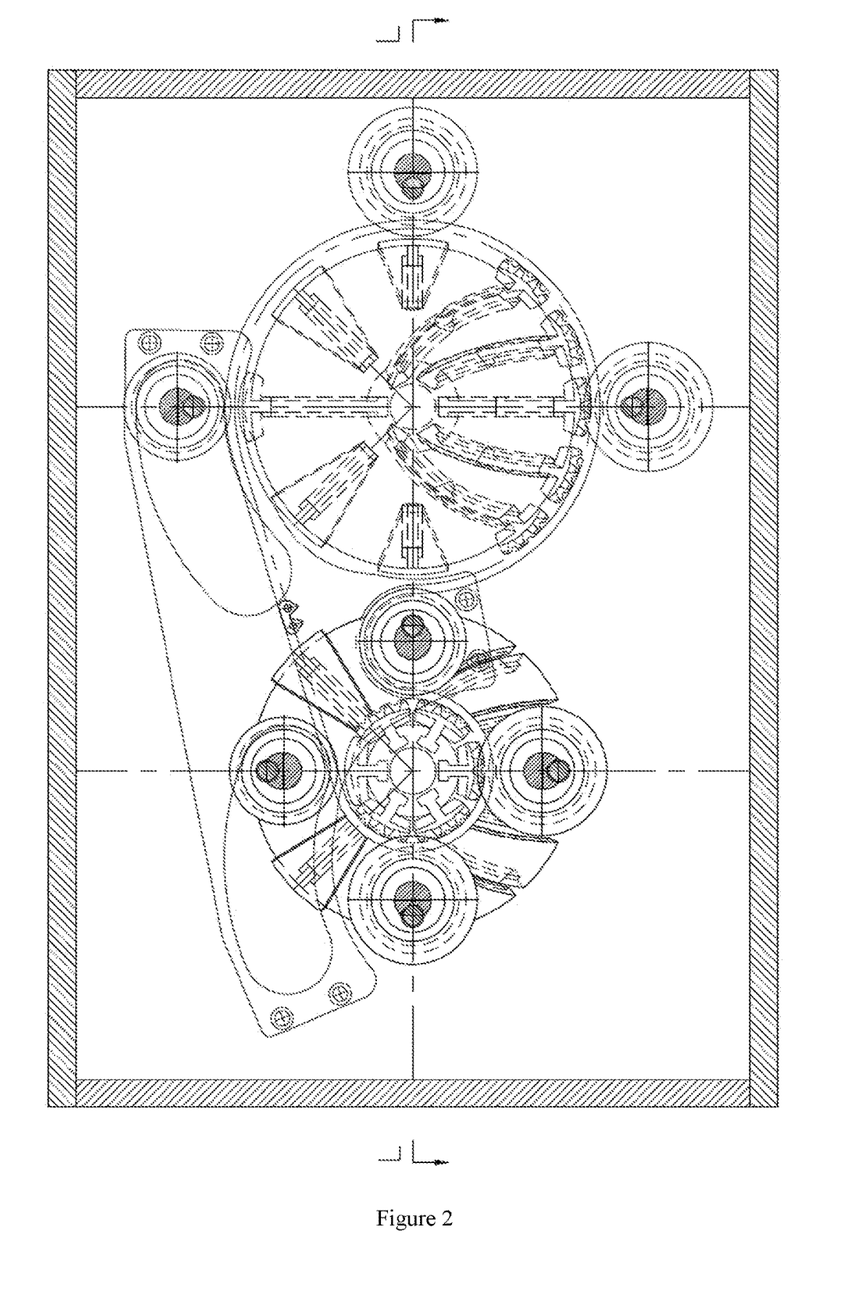
FIG. 2 is a sectional view of the present invention in the B-B direction while it is running at a low speed.
Figure 3:
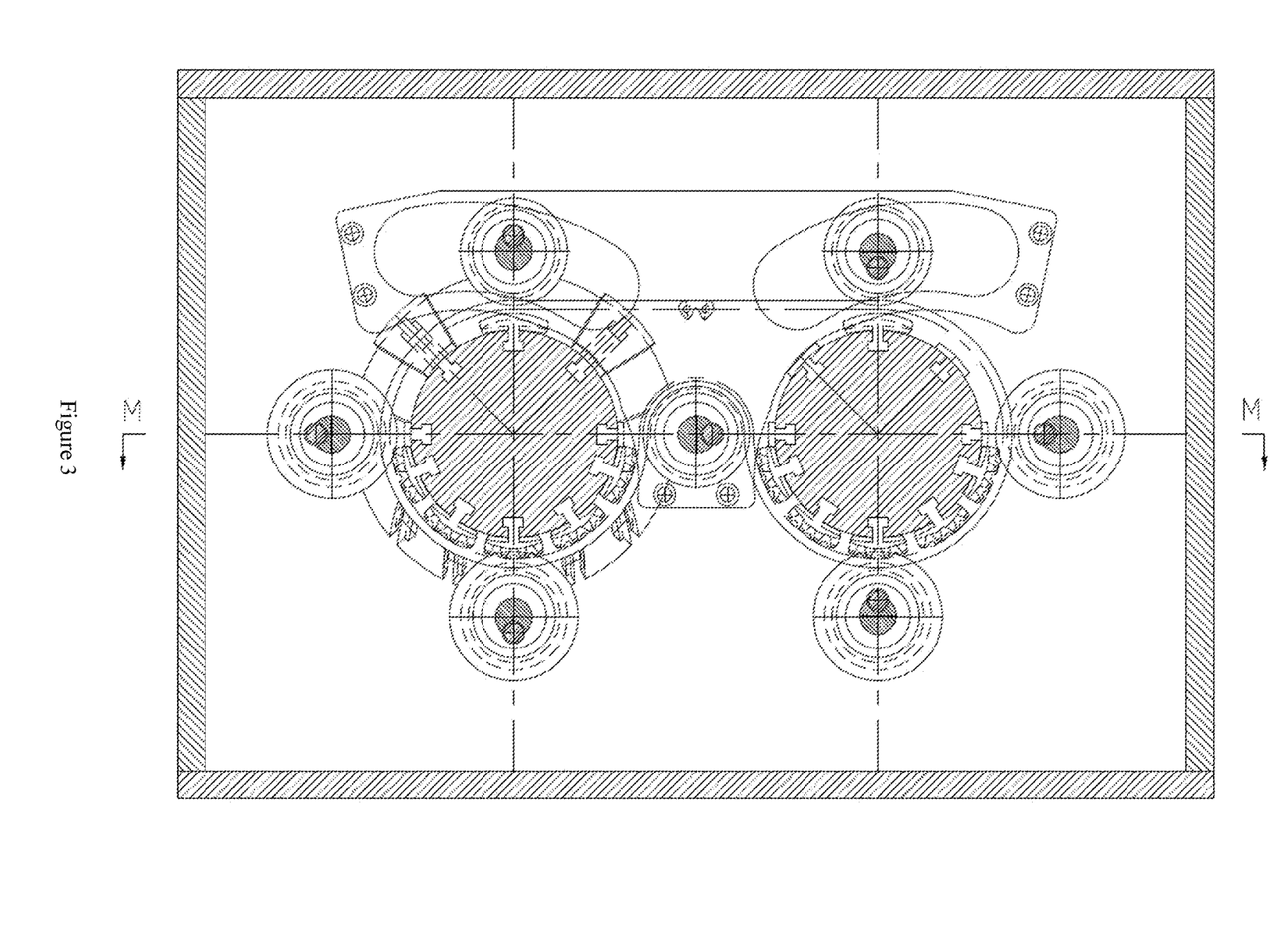
FIG. 3 is a sectional view of the present invention in the C-C direction while it is running at a medium constant speed.
Figure 6:
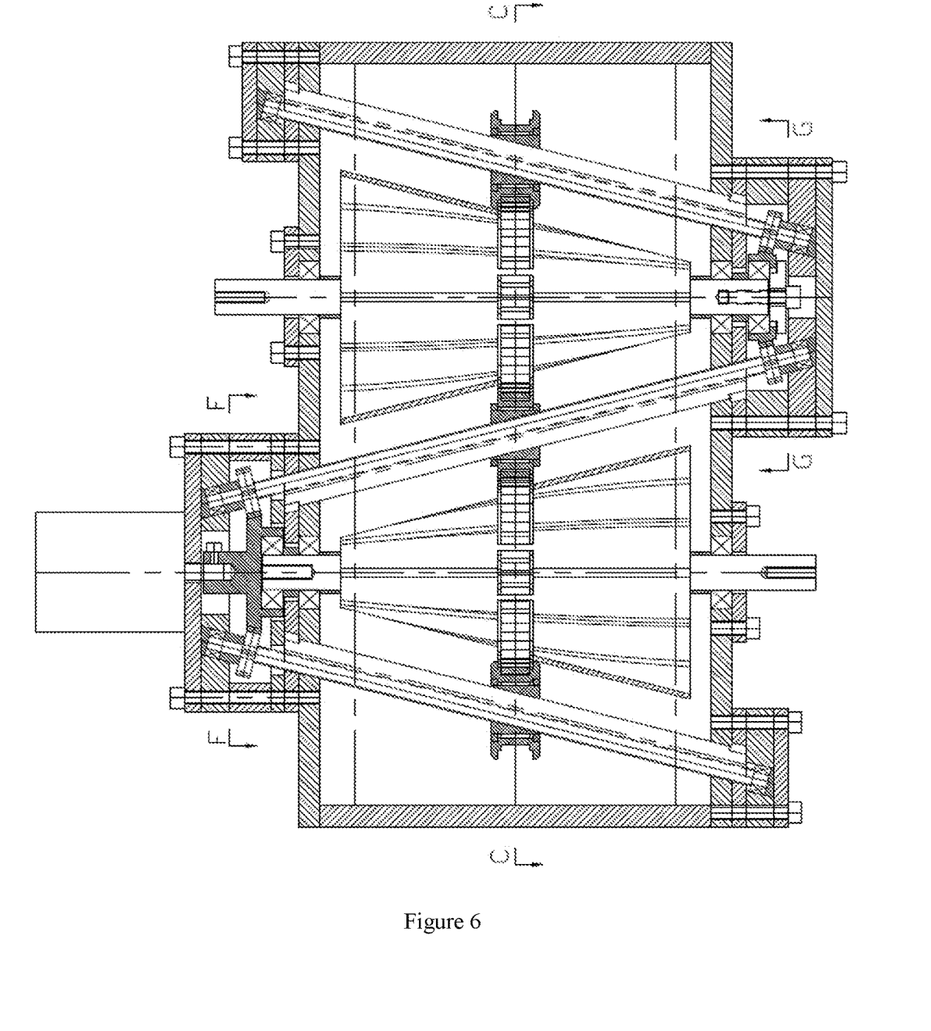
FIG. 6 is a top view of the present invention in the M-M direction while it is running at a medium constant speed, and is also a top view of the axial speed adjustment actuator of the present invention while it is running at a medium constant speed.
Figure 8:
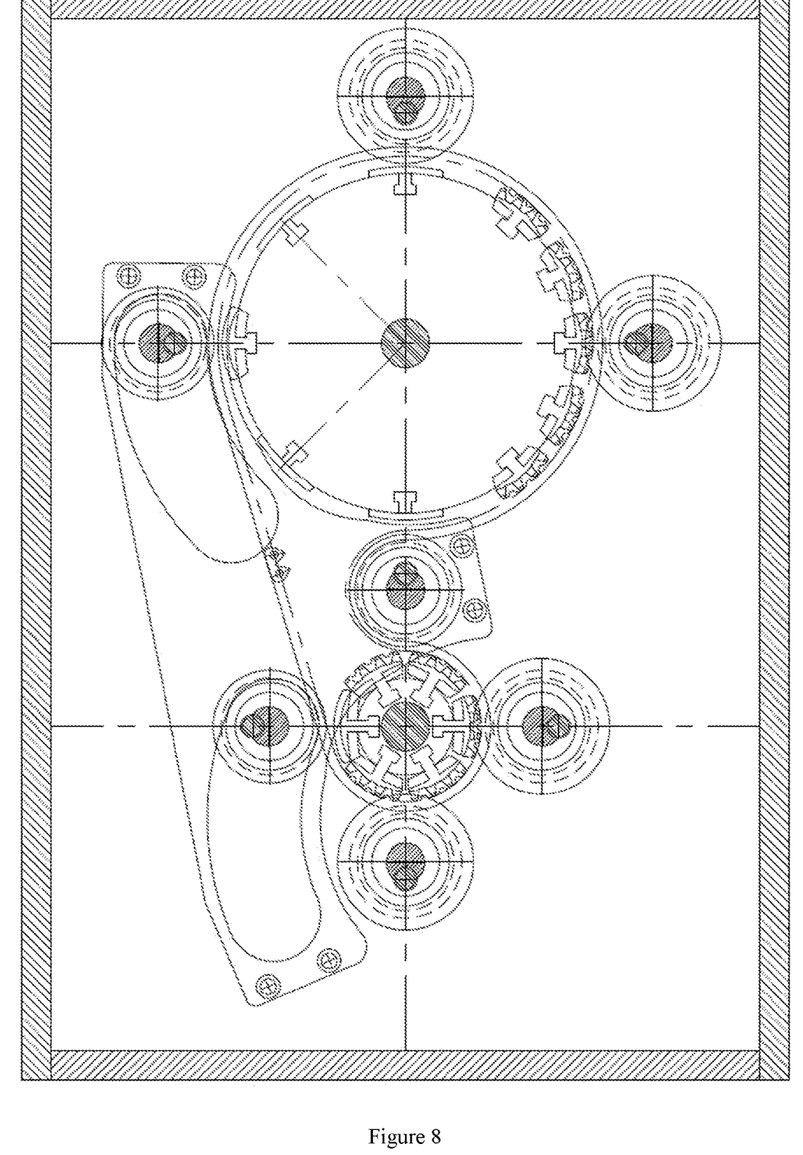
FIG. 8 is a sectional view of the present invention in the B-B direction while it is running at a low speed.
Figure 9:
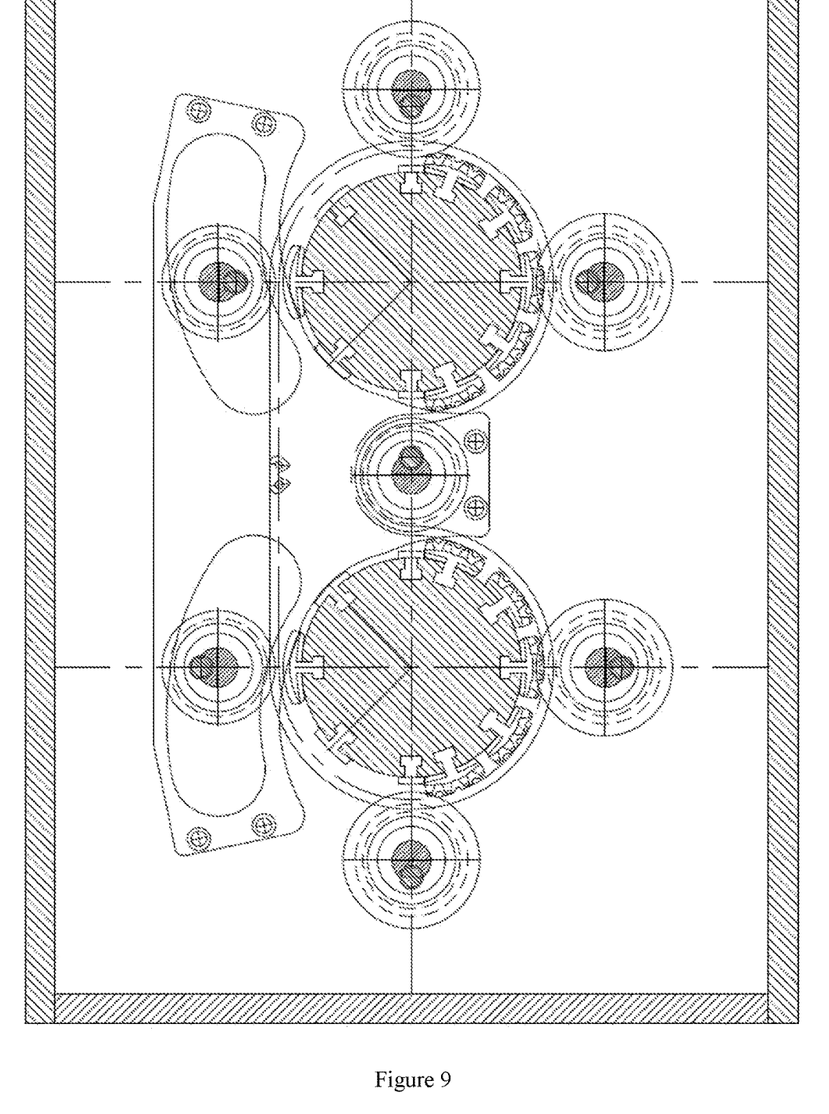
FIG. 9 is a sectional view of the present invention in the C-C direction while it is running at a medium constant speed.
Figure 10:
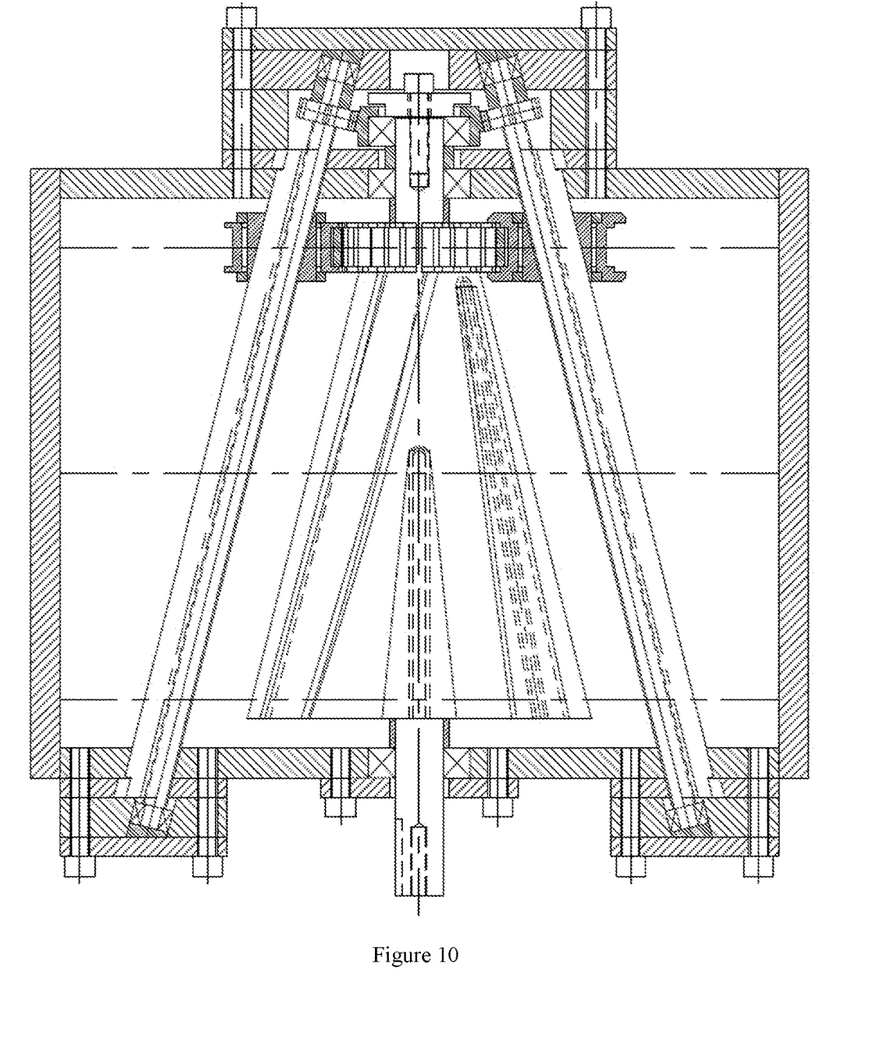
FIG. 10 is a right sectional view of the present invention in the D-D direction.

When the rotational speed adjustment servo motor 8 rotates, it drives the input shaft rotational speed adjustment sun gear 9 to rotate, then drives the four input shaft rotational speed adjustment planet gears 10 to rotate, and then drives the three input shaft rotational speed adjustment lead screws 7 fitted on the planet gears through a keyway and one rotational speed adjustment lead screw 11 shared by the input and output shafts to rotate, and finally makes the three toothed-chain rotational speed input adjusting nut idler wheel 6 and one rotational speed adjustment nut idler wheel 13 shared by the toothed-chain input and output shafts move on the four rotational speed adjustment screw guide pillars 12, so as to change the transmission speed of the tooth-shaped chain 3 by changing the different rotational diameter position of the tooth-shaped chain 3 on the power input shaft conical roller 1; that is, the rotational speed is finally changed by changing the engagement diameter position of the sectional flexible sprocket and the tooth-shaped chain on the power input shaft conical roller 1 and the power output shaft conical roller 5. When the tooth-shaped chain 3 and the rotational speed adjustment nut idler wheel move to the positions shown in FIGS. 1, 4 and 7 along the rotational speed adjustment lead screw and the guide pillar, the transmission outputs the maximum rotational speed. When the tooth-shaped chain and the rotational speed adjustment nut idler wheel move to the positions shown in FIGS. 2, 5 and 8 along the rotational speed adjustment lead screw and the guide pillar, the transmission outputs the minimum rotational speed. When the tooth-shaped chain and the rotational speed adjustment nut idler wheel move to the positions shown in FIGS. 3, 6 and 9 along the rotational speed adjustment lead screw and the guide pillar, the transmission has the same input and output rotational speed.

III. The sliding track of the tooth-shaped chain and the sectional T-shaped flexible sprocket member, and the anti-skid tensioning positioning mechanism:

In FIG. 7: The T-shaped tooth-shaped chain anti-skid tensioning block 18 can prevent the tooth-shaped chain from sliding loose when it rotates with the conical roller, thus acting as an anti-skid tensioning tooth-shaped chain. The T-shaped flexible sprocket member anti-skid positioning mechanism 19 may play a role of positioning the tooth-shaped chain 3 and the sectional T-shaped flexible sprocket member when they pass a separation arc section in rotating with the conical roller, so as to prevent the tooth-shaped chain 3 and the sectional T-shaped flexible sprocket member from sliding loose in the five T-shaped grooves on the conical roller.

IV. The dynamic balance adjustment mechanism during rotation of the power input and output shaft conical rollers:

In FIG. 11: A conical toothed-chain symmetrical tensioning balance block 20 and a conical toothed-chain tensioning balance block 21 play a role of tensioning the tooth-shaped chain 3. They can adjust the dynamic balance when the power input shaft conical roller 1 and the power output shaft conical roller 5 are rotating.

What is claimed is:

1. A flexibly engaged continuously variable transmission gearbox comprising the following components connected sequentially: a power input shaft conical roller→a sectional input flexible sprocket→a tooth-shaped chain→a sectional output flexible sprocket→a power output shaft conical roller;

wherein the power input shaft conical roller rotates, the power input shaft conical roller drives five sectional input flexible sprocket members that are slidably matched in five equidistant T-shaped grooves on the conical roller to rotate; then the sectional input flexible sprocket drives the tooth-shaped chain engaged therewith to transmit, and thus drives the five sectional output flexible sprocket members that are slidably matched in the five equidistant T-shaped grooves on the output shaft conical roller to rotate, with the five sectional output flexible sprocket members connected to the output shaft conical roller through the five equidistant slidable T-shaped grooves, thus driving the output shaft conical roller to rotate to output power; and wherein a sectional T-shaped flexible sprocket sliding track has five T-shaped grooves with an always equal groove spacing in different diameter positions on the input and output shaft conical rollers, respectively, wherein the T-shaped groove slidably fits in size with a T-shaped insert at the lower part of the T-shaped sprocket member, and the sliding direction of the T-shaped groove is determined by the diameters all over the conical roller or the engagement linear velocity.

2. The flexibly engaged continuously variable transmission gearbox according to claim 1, characterized in that: the variable transmission is achieved by engagement of the tooth-shaped chain with the sectional flexible sprocket; the sectional flexible sprocket with an equal pitch of teeth, respectively composed of five sectional T-shaped sprocket members, slides in five equidistant T-shaped grooves on input and output shaft conical rollers; the sectional flexible sprocket, by sliding in different engagement diameter positions on the conical roller, can make the engagement linear velocity of the flexible sprocket and the tooth-shaped chain become greater or less, the larger the diameter the greater the linear velocity, the smaller the diameter the less the linear velocity, so that output shaft rotational speed is changed.

3. The flexibly engaged continuously variable transmission gearbox according to claim 1, characterized in that: input and output flexible sprockets respectively are an open sprocket composed of five sectional T-shaped sprocket members; the T-shaped sprocket members are provided on their upper part with sprocket teeth having an equal pitch of teeth, also the distance among the T-shaped sprocket members, and can engage with the tooth-shaped chain for transmission; the T-shaped sprocket members are provided on their lower part with a T-shaped block that is slidable in the T-shaped groove on the input or output shaft conical roller, thus forming the sectional flexible sprocket.

4. The flexibly engaged continuously variable transmission gearbox according to claim 1, characterized in that: a sectional T-shaped flexible sprocket member anti-skid positioning mechanism is composed of two identical T-shaped plates fastened and connected oppositely by a pin, wherein a circular hole at the lower part of the T-shaped plate is put around a rotational speed adjustment nut idler wheel shared by toothed-chain input and output shafts, and two waist-shaped arc holes are put around a toothed-chain input shaft rotational speed adjustment nut idler wheel and a toothed-chain output shaft rotational speed adjustment nut idler wheel, respectively.

5. The flexibly engaged continuously variable transmission gearbox according to claim 1, characterized in that: an anti-skid tensioning positioning mechanism of the tooth-shaped chain is composed of two T-shaped toothed-chain anti-skid tensioning blocks that slide respectively in one respective linear T-shaped groove on the input and output shaft conical rollers.

6. The flexibly engaged continuously variable transmission gearbox according to claim 1, characterized in that: with the T-shaped sprocket members provided on their upper part with sprocket teeth having an equal pitch of teeth, the sprocket teeth are parallel to the centerline of the input or output shaft conical roller and engage with the tooth-shaped chain for transmission, and the T-shaped block at the lower part slidably fits in shape and size with the T-shaped groove on the conical roller.

7. The flexibly engaged continuously variable transmission gearbox according to claim 1, characterized in that: a dynamic balance adjustment mechanism during rotation of the power input and output shaft conical rollers is composed of two conic arc toothed-chain symmetrical tensioning balance blocks and two conic arc toothed-chain tensioning balance blocks fastened inside four linear balance grooves on the respective conical rollers.

8. The flexibly engaged continuously variable transmission gearbox according to claim 1, characterized in that: the power input and output shaft conical rollers are two truncated cones having the equal diameter and taper, and are arranged in the transmission forwardly and reversely; and the power input and output shaft conical rollers are provided respectively on their surface with five T-shaped grooves always equidistant in different diameter positions, one T-shaped toothed-chain anti-skid tensioning block linear T-shaped groove, and four fastening balance block linear T-shaped grooves, totally ten T-shaped grooves.

9. The flexibly engaged continuously variable transmission gearbox according to claim 1, characterized in that: a rotational speed adjustment actuator of the transmission works as follows: a rotational speed adjustment servo motor drives a rotational speed adjustment sun gear, then drives input and output shaft rotational speed adjustment planet gears engaging with the sun gear to rotate, then drives an input and output shaft rotational speed adjustment lead screw to rotate by a fixed key, and then drives the input and output shaft rotational speed adjustment nut idler wheel on the rotational speed adjustment screw guide pillar to move linearly, and finally drives the tooth-shaped chain and the sectional flexible sprocket to make translation in different engagement diameter positions on the input and output shaft conical rollers, so as to adjust the rotational speed of the output shaft.

\* \* \* \* \*